United States Patent
Damgaard et al.

(10) Patent No.: US 10,508,642 B2
(45) Date of Patent: Dec. 17, 2019

(54) ROTOR BLADE PITCH ARRANGEMENT

(71) Applicant: Siemens Gamesa Renewable Energy A/S, Brande (DK)

(72) Inventors: Steen Damgaard, Herning (DK); Soeren Forbech Elmose, Bording (DK)

(73) Assignee: Siemens Gamesa Renewable Energy A/S (DK)

( * ) Notice: Subject to any disclaimer, the term of this patent is extended or adjusted under 35 U.S.C. 154(b) by 219 days.

(21) Appl. No.: 15/642,949

(22) Filed: Jul. 6, 2017

(65) Prior Publication Data
US 2018/0017041 A1 Jan. 18, 2018

(30) Foreign Application Priority Data
Jul. 12, 2016 (EP) .................................... 16179068

(51) Int. Cl.
*F03D 1/00* (2006.01)
*F03D 7/02* (2006.01)
*F03D 1/06* (2006.01)
*F03D 80/70* (2016.01)

(52) U.S. Cl.
CPC ......... *F03D 7/0224* (2013.01); *F03D 1/0658* (2013.01); *F03D 1/0666* (2013.01); *F03D 1/0675* (2013.01); *F03D 1/0691* (2013.01); *F03D 7/024* (2013.01); *F03D 80/70* (2016.05); *F05B 2240/54* (2013.01); *F05B 2250/36* (2013.01); *F05B 2260/503* (2013.01); *F05B 2260/74* (2013.01); *F05B 2260/76* (2013.01); *F05B 2260/79* (2013.01); *Y02E 10/721* (2013.01)

(58) Field of Classification Search
CPC ...... F03D 1/0675; F03D 1/0691; F03D 7/024; F03D 1/0658; F05B 2260/74; F05B 2260/76; F05B 2260/79
See application file for complete search history.

(56) References Cited

U.S. PATENT DOCUMENTS 5,875,677 A * 3/1999 Ogishima ............... F02N 15/00
74/7 A
7,470,111 B2 * 12/2008 Schubert ............... F03D 1/0658
416/155
(Continued)

FOREIGN PATENT DOCUMENTS

CN 103270293 A 8/2013
CN 104728056 A 6/2015
(Continued)

*Primary Examiner* — Ninh H. Nguyen
(74) *Attorney, Agent, or Firm* — Schmeiser, Olsen & Watts LLP

(57) ABSTRACT

A blade pitch arrangement of a wind turbine is provided having a number of blade shafts extending radially outward from a hub and a rotor blade mounted around each blade shaft, which blade pitch arrangement includes a toothed ring arranged at the root end of each rotor blade; and a pitch drive unit for each rotor blade, having a driver body and a pinion realized to engage with the toothed ring of a rotor blade; wherein a pitch drive unit is arranged relative to its corresponding rotor blade such that the pinion is positioned closest to the hub, and the driver body extends in a direction radially outward from the hub. A wind turbine is also described.

13 Claims, 3 Drawing Sheets

(56) References Cited

U.S. PATENT DOCUMENTS

| | | | | |
|---|---|---|---|---|
| 7,866,946 B2* | 1/2011 | Nitzpon | ................ | F03D 1/0658 |
| | | | | 416/1 |
| 8,348,598 B2* | 1/2013 | Watanabe | ............... | F03D 80/70 |
| | | | | 290/44 |
| 8,459,946 B2* | 6/2013 | Yoshida | ................ | F03D 7/0224 |
| | | | | 416/153 |
| 8,684,693 B2* | 4/2014 | Mascioni | .............. | F03D 7/0224 |
| | | | | 416/162 |
| 9,353,729 B2* | 5/2016 | Wilson | ................. | F03D 1/0658 |
| 2013/0243599 A1 | 9/2013 | Pasquet | | |
| 2014/0361547 A1 | 12/2014 | Alti Barbon et al. | | |

FOREIGN PATENT DOCUMENTS

| | | |
|---|---|---|
| CN | 204805044 U | 11/2015 |
| EP | 2623773 A1 | 8/2013 |
| EP | 2679816 A1 | 1/2014 |
| EP | 2702267 B1 | 3/2016 |
| JP | 2004108164 A | 4/2004 |
| JP | 5074443 B2 | 11/2012 |
| KR | 20140086198 A | 7/2014 |

* cited by examiner

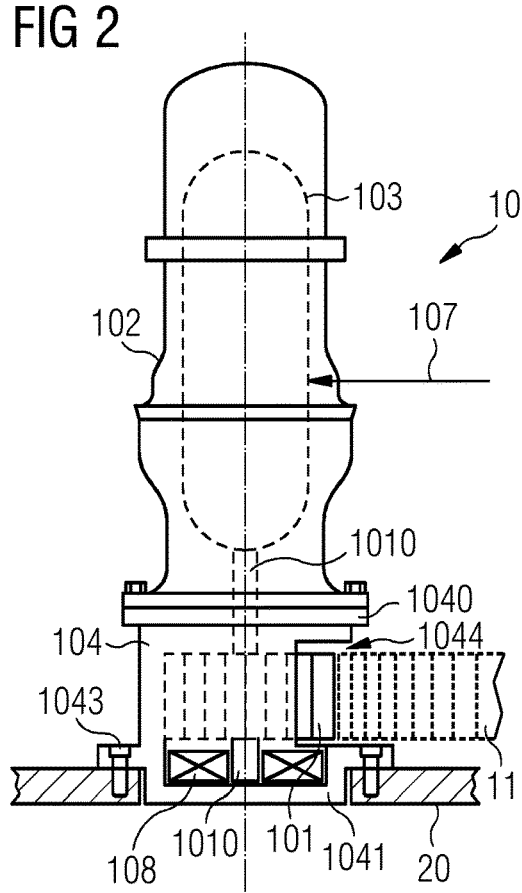
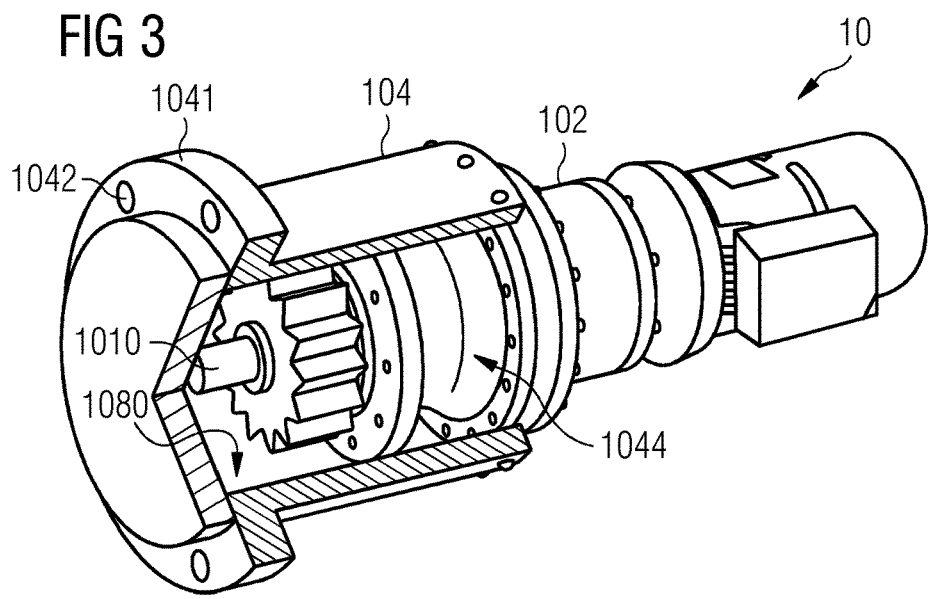

ROTOR BLADE PITCH ARRANGEMENT

CROSS-REFERENCE TO RELATED APPLICATION

This application claims priority to European application No. 16179068.8 having a filing date of Jul. 12, 2016, the entire contents of which are hereby incorporated by reference.

FIELD OF TECHNOLOGY

The following describes a rotor blade pitch arrangement of a wind turbine. The following further describes a wind turbine.

BACKGROUND

A wind turbine is preferably controlled to extract as much energy as possible from the wind. Therefore, most wind turbines feeding into a power grid have pitch control systems that can control the rotor blade pitch angles in response to wind speed or grid requirements, and also to furl the blades in the event of excessively high winds. The pitch control system of a wind turbine is generally located in the hub. Pitch control systems have conventionally been realized as hydraulic systems. However, electric pitch systems are becoming more widespread for various reasons such as ease of maintenance and for environmental considerations.

Various embodiments are possible for a pitch-controlled rotor blade. In each case, the rotor blade is caused to turn about its longitudinal axis. In one realisation, a circular blade root end is mounted to a circular pitch ring, which in turn is mounted to the hub of the wind turbine. The pitch ring can have an inner or outer toothed ring which is driven by a corresponding pinion or gear of the pitch system. A large annular bearing such as a fluid bearing is required to ensure smooth motion of the blade relative to the hub. This type of blade design is associated with very high loading on the pitch system.

In an alternative design, the blade is mounted on a cylindrical blade shaft, which is rigidly secured to the hub and which extends radially outward from the hub. Two or more annular bearings arranged between the blade shaft and the blade, separated by a certain bearing separation distance, ensure a smooth motion of the blade as it rotates about its longitudinal axis. The length of the blade shaft can comprise more than 15% of the total blade length, so that loads acting on the blade are evenly transferred to the bearings on the blade shaft. In this case also, the blade pitch angle can be controlled by an annular gear comprising a toothed ring about the blade root end, arranged to engage with a pinion that is driven by a pitch system. A problem associated with this type of design is that components of the pitch system—for example a drive unit containing the transmission systems, cables connecting the drive units to a power source and to a controller, etc.—must be accommodated in the hub area close to the blades. Furthermore, the pitch drive unit of each rotor blade must be mounted so that it is stationary relative to the blade shaft. In a known embodiment, the pitch drive unit is mounted to an exposed inner portion of the blade shaft between the hub and the root end rotor blade. In this design, the blade shaft length comprises the bearing separation distance and this "extra length", since the exposed portion of the blade shaft must be long enough to accommodate the pitch drive unit. However, since the rotor blade and the bearings must then be located further outward from the hub, the loading experienced by the bearings is correspondingly high. The bearings must be dimensioned to withstand this loading. This adds to the cost of the bearings. Alternatively or in addition, the blade shaft must be made longer. The necessity of having to reserve a length of the blade shaft to mount the pitch drive unit therefore adds to the overall cost and weight, particularly since the blade shaft is usually made of cast steel.

SUMMARY

An aspect relates to an improved pitch system that overcomes the problems described above.

According to embodiments of the invention, the blade pitch arrangement is intended for use in a wind turbine having a number of blade shafts extending radially outward from a hub and a rotor blade mounted around each blade shaft. The blade pitch arrangement according to embodiments of the invention comprises a toothed ring of an annular gear arranged at the hub end of each rotor blade, and a pitch drive unit for each rotor blade, comprising a pinion realised to engage with the toothed ring of a rotor blade and a driver for turning the pinion. The blade pitch arrangement according to embodiments of the invention is characterized in that a pitch drive unit is arranged relative to its corresponding rotor blade such that the pinion is positioned closest to the hub, and a driver body extends radially outward from the hub.

An advantage of the inventive blade pitch arrangement is that the orientation of the pitch drive units relative to the hub allows the root ends of the rotor blades to be brought further inwards towards the hub. The inner end of a rotor blade with its toothed ring is therefore positioned close to the hub or directly adjacent to the hub, where it can engage with the pinion of the pitch drive unit. As explained in the introduction, this type of rotor blade is rotatably mounted about a long blade shaft by means of a bearing arrangement, usually comprising an inner and outer bearing located some distance apart along the shaft. The bearings must be able to withstand considerable loads, especially in the case of long rotor blades of the type described above. By arranging the pinion close to the hub, and by extending the blade root length to bring the toothed ring further inwards, it is possible to also arrange the inner bearing closer to the hub. A decreased loading of the inner bearing results from the reduced distance between inner bearing and hub, and/or from an increased distance between inner and outer bearings. The reduced loading on the bearings can favourably extend the lifetime of the bearings and/or can allow the bearing dimensions to be reduced. Since the inner bearing is closer to the hub, the outer bearing can also be moved inward (for example to maintain the conventional distance between the bearings), so that the blade shaft length can be reduced, thereby saving material cost and weight.

According to embodiments of the invention, the wind turbine comprises a hub, a number of blade shafts extending radially outward from the hub, a rotor blade mounted around each blade shaft, and a blade pitch arrangement according to embodiments of the invention. A spinner or cover is preferably arranged to enclose the pitch drive units and the hub, thereby protecting these and other components from the environment.

An advantage of the wind turbine according to embodiments of the invention is that the orientation of the pitch drive units allows the root ends of the rotor blades to be positioned in close proximity to the hub. This in turn results in a decreased loading of the bearings between the blade shaft and a rotor blade. As explained above, the reduced loading on the bearings can favourably extend the lifetime of the bearings and/or can allow the bearing dimensions to be reduced. Equally, since the inner bearing can also be moved further inwards towards the hub in the inventive design, the outer bearing can also be moved inward (essentially maintaining the distance between the bearings), so that the blade shaft length can be reduced, thereby saving material cost and weight.

Particularly advantageous embodiments and features of the invention are given by the dependent claims, as revealed in the following description. Features of different claim categories may be combined as appropriate to give further embodiments not described herein.

The blade pitch arrangement can be used for a wind turbine having any suitable number of pitch-controlled blades. In the following, it may be assumed that a wind turbine has an arrangement of three rotor blades mounted to the hub to face into the wind. A rotor blade of this type of wind turbine can have a length exceeding 15 m, for example in the region of 90-130 m.

Without restricting embodiments of the invention in any way, it may also be assumed that the wind turbine has a hub assembly comprising a central hub and three blade shafts extending radially outward from the hub. A rotor blade is rotatably mounted about each blade shaft, an annular gear arrangement (comprising a toothed ring and a pinion) is used to turn the blade about its longitudinal axis. Since the toothed ring of the annular gear arrangement is generally arranged on the outside of the rotor blade in this kind of pitch system, the pitch drive unit is also arranged on the outside of the rotor blade.

Usually, a wind turbine controller analyses various parameters such as information from wind speed sensors to determine the required degree of pitch for the blades in order to achieve an optimal power output. In the following, it may be assumed that the pitch drive units are controlled by drive signals originating from such a controller.

The pitch drive unit can be realized with any suitable transmission system for turning the pinion in order to pitch the blade about its longitudinal axis. For example, the pinion can be mounted at one end of a drive shaft, and an electric motor and a gear train can turn the drive shaft in order to turn the pinion. Preferably, the transmission system is enclosed in a housing as part of the driver body.

The pitch drive unit can be secured to the hub assembly in any appropriate manner. Preferably, the pitch drive unit comprises a bracket arranged to partially enclose the pinion, and a mounting interface adapted for mounting the pitch drive unit to the hub. The mounting interface can for example be a flange formed on the pinion bracket, with a number of holes through which bolts or other fasteners can be inserted. With a complementary arrangement of matching through-holes in the hub, the pitch drive unit can be securely bolted to the hub. In a preferred embodiment of the invention, the pinion bracket extends into a correspondingly shaped seat or opening in the hub.

During operation of the pitch drive system, the drive shaft of the pitch drive unit makes the pinion rotate. Since the pinion engages with the toothed ring of the blade, the blade is made to turn about its longitudinal axis. To work efficiently, the axis of the drive shaft should be parallel to the blade axis. However, the pinion will experience an outward lateral force that may detract from the efficiency of operation. Therefore, in a preferred embodiment of the invention, the drive shaft of the pitch drive unit preferably extends by a short distance into an interior cavity of the pinion bracket, and a bearing is arranged in the interior cavity of the pinion bracket to support that end of the drive shaft. In this arrangement, the bearing effectively counteracts a lateral force acting on the pinion during operation.

As indicated above, the rotor blade is mounted about a blade shaft extending radially outward from the hub. Preferably, the bearing arrangement comprises a pair of annular bearings separated by a distance, so that an inner bearing is located inwards near the hub, and an outer bearing is located some distance outwards in the direction of the blade tip.

The blade shafts are preferably made of a structurally strong material. In a preferred embodiment of the invention, a blade shaft essentially comprises a hollow cylinder made of cast steel or another material such as glass fibre. The wall thickness and length of the blade shaft may be chosen on the basis of the length and weight of the blade to be supported. Preferably, a blade shaft extends radially outward within the rotor blade to a distance of at most 40%, more preferably at most 15% of the length of the rotor blade. In the inventive blade pitch arrangement, the distance between an inner and outer bearing is essentially the same as the length of the blade shaft, since the inner bearing can be positioned very close to the hub, and the outer bearing can be positioned close to the outer (tip-end) end of the blade shaft.

BRIEF DESCRIPTION

Some of the embodiments will be described in detail, with reference to the following figures, wherein like designations denote like members, wherein:

FIG. 2 shows an exemplary connection between a pitch drive unit and a hub in an embodiment of a blade pitch arrangement according to embodiments of the invention;

FIG. 3 shows an embodiment of a pitch drive unit of a blade pitch arrangement according to embodiments of the invention.

DETAILED DESCRIPTION

Figure 1:
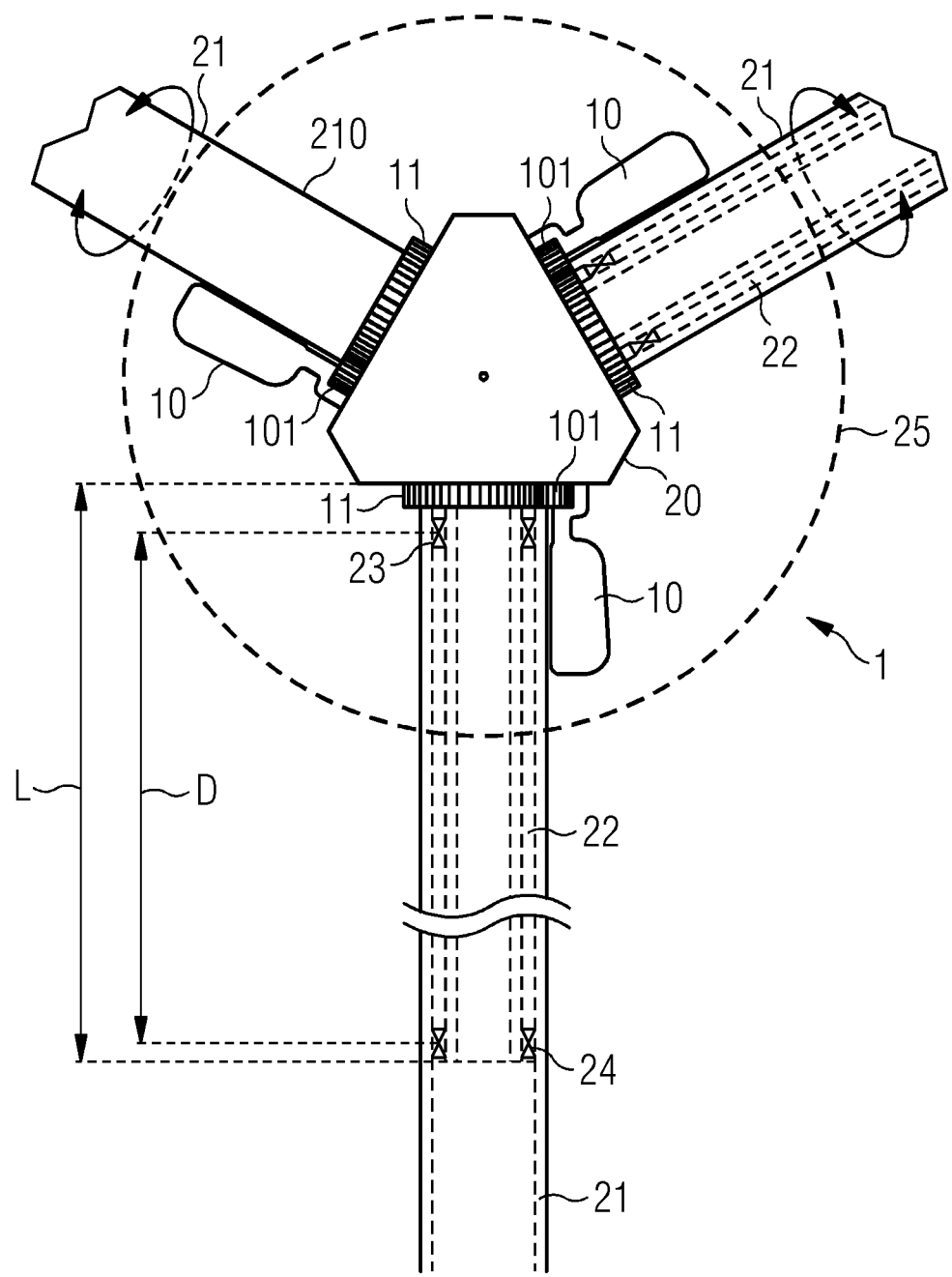
FIG. 1 shows a front region of an embodiment of a wind turbine according to embodiments of the invention.

FIG. 1 shows a front region of a wind turbine 2, and shows a hub 20 to which three rotor blades 21 are mounted. Each blade 21 is mounted around a shaft 22 extending radially outward from the hub 20. Each shaft 22 is rigidly connected to the hub 20 and provides a support for its blade 21. A bearing arrangement 23, 24 between a blade 21 and its shaft 22 allows rotational motion of the blade 21 about its longitudinal axis as indicated in the diagram. A shaft 22 can be a hollow tube, cast in one piece, and is preferably made of a structurally strong material such as steel.

Each rotor blade 21 terminates in a circular root end region 210. In this embodiment of the inventive blade pitch arrangement 1, a toothed ring 11 of an annular gear is shown on the outside of each rotor blade root 210. A pitch drive unit 10 is used to adjust the pitch angle of a rotor blade 21, as indicated by the double-pointed arrows, and the diagram shows that each rotor blade 21 is equipped with such a pitch drive unit 10. The hub 20, the root end regions 210 and the pitch drive units 10 are enclosed in a spinner 25 as indicated by the broken lines. The spinner 25 in this embodiment will have three circular openings through which the blades 21 extend.

The inventive blade pitch arrangement 1 is given by the arrangement of the pitch drive unit 10 with its pinion 101 closest to the hub 20, and its driver body 102 extending radially outward from the hub 20. In this arrangement, the root end 210 of each blade 21 is brought further inward (relative to a similar pitch arrangement known from the prior art) so that its toothed ring 11 is also adjacent to the hub 20. The advantage of this arrangement is that the blade root end is closer to the hub, thereby significantly reducing the loading on the bearings 23, 24. This means that the bearings 23, 24 can be dimensioned according to the reduced loading (thereby reducing their cost) and/or the bearing separation D and shaft length L can be reduced (thereby reducing the shaft cost) and/or the outer bearing 24 can be brought further inward.

In this frontal view of the exemplary blade pitch arrangement, each pitch drive unit 10 has been shown to one side of a rotor blade so that the rotational axes of blade and pinion are in the plane of the page. Of course, any other arrangement is possible, for example a pitch drive unit 10 can be positioned in front of the rotor blade 21 ("upwind") or behind the rotor blade 21 ("downwind") as appropriate.

FIG. 2 shows an exemplary connection of a pitch drive unit 10 to the hub 20. The pitch drive unit 10 has a gearbox 103 or transmission system 103 arranged in a driver body 102. Usually, the transmission 103 turns the pinion 101 by a specific amount and in a specific direction in response to drive signal 107 originating from the wind turbine pitch control unit (not shown).

The diagram shows the driver body 102 facing radially outward from the hub 20. To hold the pitch drive unit 10 in place, it is provided with a pinion bracket 104 arranged to extend around the pinion 101 (leaving this free to engage with the toothed ring 11 of the rotor blade 21) and to engage with the hub 20 as shown. The pinion bracket 104 can be a custom-designed piece shaped at its outer end to complement the shape of the hub 20 to which it will be mounted, and shaped at its inner end to be fastened to the driver body 102 of the pitch drive unit 10. In this exemplary embodiment, the pinion bracket 104 is secured to the driver body 102 by an outer flange 1040 and fasteners. Similarly, an inner or hub-end flange 1041 of the pinion bracket 104 is provided with through-holes 1042 (shown in FIG. 3) so that the pitch drive unit 10 can be secured to the hub 20 by a number of bolts 1043 inserted into corresponding through-holes formed in the hub 20. Here, the pinion bracket 104 is shaped to extend into an opening formed in the hub 20. The hub end of the pinion bracket 104 therefore provides an interior cavity with room for a bearing seat to accommodate a bearing 108 into which the drive shaft 1010 can extend. Preferably, the bearing 108 supports the drive shaft 1010 so that its axis of rotation does not deflect from its intended orientation (vertical in this diagram). In this way, the pitch drive unit 10 is realized to counteract a force acting on the pinion 101 during operation of the blade pitch arrangement 1.

FIG. 3 is a further schematic drawing of such a pitch drive unit 10, showing the housing 102 enclosing a transmission arrangement which can be driven by an electric motor 103, for example, to perform torque conversion for the pinion. The diagram also shows the pinion bracket 104 extending about the pinion 101 and secured to the driver body 102 by an arrangement of radially inserted fasteners. At the hub end of the pinion bracket 104, a flange 105 is provided with through holes so that the pitch drive unit 10 can be mounted to a supporting structure such as the hub.

In this exemplary embodiment, the pinion bracket 104 is secured to the driver body 102 by a number of fasteners such as screws or bolts, and a flange 1041 at the "hub end" of the pinion bracket 104 is provided with through-holes 1042 so that the pitch drive unit 10 can be secured to the hub 20 by a number of bolts 1043 inserted into corresponding through-holes formed in the hub 20. The diagram also indicates a bearing seat 1080 for a bearing (not shown) that will support the drive shaft 1010 during operation of the pitch drive unit 10.

Figure 4:
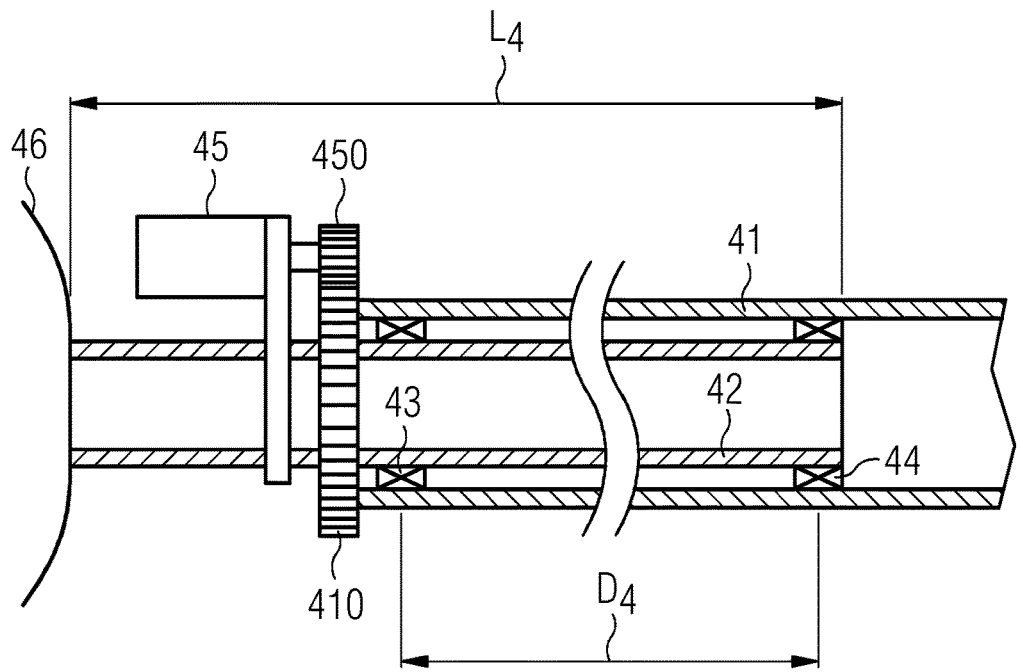
FIG. 4 shows a conventional blade pitch arrangement.

FIG. 4 shows part of a conventional pitch assembly with a rotor blade 41 mounted about a blade shaft 42 extending outward from a hub 46 of a wind turbine, and a pitch drive unit 45 arranged to turn the blade 41. In this arrangement, the pitch drive unit 45 is generally arranged so that the driver body points inwards towards the hub 46, and the pinion 450 is located furthest outward from the hub 46. The reason for this arrangement is the established or legacy design of the pitch drive unit 45, which requires a certain offset between blade 41 and hub 46 to accommodate the pitch drive 45. This arrangement sets the position of the inner bearing 43. In order to meet the load-bearing requirements, the blade shaft 42 must have a sufficient length $L_4$ to achieve a desired bearing spacing $D_4$ and/or the bearings 43, 44 must be sufficiently large. To reduce the loading on the bearings 43, 44, the shaft length $L_4$ could be increased, but this adds to the weight and cost of the shaft 42, which is usually made of cast steel for structural strength. Alternatively, the bearings 43, 44 must be large enough to withstand the loading, so that these components 43, 44 generally add significantly to the overall manufacturing cost.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A blade pitch arrangement of a wind turbine having a number of blade shafts extending radially outward from a hub and a rotor blade mounted around each blade shaft, which blade pitch arrangement having
    a toothed ring arranged at the root end of each rotor blade; and
    a pitch drive unit for each rotor blade, including a driver body and a pinion realized to engage with the toothed ring of a rotor blade;
comprising the pitch drive unit arranged relative to its corresponding rotor blade such that the pinion is positioned closest to the hub, and the driver body extends in a direction radially outward from the hub; and
    a pinion bracket, wherein the pinion bracket comprises a hub mounting interface adapted for mounting the pitch drive unit to the hub.

2. A blade pitch arrangement according to claim 1, wherein the pitch drive unit comprises a transmission system enclosed in the driver body.

3. A blade pitch arrangement according to claim 1, wherein the pitch drive unit comprises the pinion bracket arranged to partially enclose the pinion, which the pinion bracket comprises a lateral opening arranged to allow the pinion to engage with the toothed ring of a rotor blade.

4. A blade pitch arrangement according to claim 3, wherein the pinion bracket comprises a drive unit mounting interface adapted for mounting the pinion bracket to the driver body of the pitch drive unit.

5. A blade pitch arrangement according to claim 1, wherein the pitch drive unit is realized such that a rotational shaft of the pitch drive unit extends into an interior cavity of the pinion bracket.

6. A blade pitch arrangement according to claim 5, comprising a bearing arranged in the interior cavity of the pinion bracket to support the hub end of the rotational shaft of the pitch drive unit.

7. A blade pitch arrangement according to claim 5, wherein the pitch drive unit is realized to counteract a force acting on the pinion during operation of the blade pitch arrangement.

8. A blade pitch arrangement according to claim 1, wherein the pitch drive unit comprises an electric pitch drive unit.

9. A blade pitch arrangement according to claim 1, wherein the toothed ring of a rotor blade is arranged on the outside of the rotor blade.

10. A wind turbine comprising a hub, a number of blade shafts extending radially outward from the hub, a rotor blade mounted around each blade shaft, and a blade pitch arrangement according to claim 1.

11. The wind turbine according to claim 10, comprising a bearing arrangement between a blade shaft and the rotor blade mounted on that shaft.

12. The wind turbine according to claim 11, wherein the bearing arrangement comprises two annular bearings separated by a distance.

13. The wind turbine according to claim 10, wherein a blade shaft extends into the rotor blade to a distance of 15%-40% of the length of the rotor blade.

* * * * *